(12) United States Patent
Okubo et al.

(10) Patent No.: US 9,834,198 B2
(45) Date of Patent: Dec. 5, 2017

(54) GENERATOR POWER CONTROL

(75) Inventors: Carol Louise Okubo, Belleville, MI (US); Shunsuke Okubo, Belleville, MI (US); Jonathan Andrew Butcher, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2459 days.

(21) Appl. No.: 12/502,539

(22) Filed: Jul. 14, 2009

(65) Prior Publication Data

US 2011/0015811 A1 Jan. 20, 2011

(51) Int. Cl.
| | |
|---|---|
| B60W 10/06 | (2006.01) |
| B60W 10/08 | (2006.01) |
| B60W 10/26 | (2006.01) |
| B60L 11/00 | (2006.01) |
| B60W 20/00 | (2016.01) |
| B60K 1/02 | (2006.01) |
| B60W 20/13 | (2016.01) |
| B60K 6/365 | (2007.10) |
| B60K 6/445 | (2007.10) |
| B60W 30/188 | (2012.01) |

(52) U.S. Cl.
CPC .............. *B60W 20/13* (2016.01); *B60K 6/365* (2013.01); *B60K 6/445* (2013.01); *B60W 10/06* (2013.01); *B60W 10/08* (2013.01); *B60W 10/26* (2013.01); *B60W 30/1882* (2013.01); *B60K 1/02* (2013.01); *B60L 2240/421* (2013.01); *B60L 2240/423* (2013.01); *B60L 2240/486* (2013.01); *B60W 20/00* (2013.01); *B60W 2510/244* (2013.01); *B60W 2540/10* (2013.01); *B60W 2710/0644* (2013.01); *B60W 2710/081* (2013.01); *B60W 2710/083* (2013.01); *B60W 2710/105* (2013.01); *Y02T 10/6239* (2013.01); *Y02T 10/6286* (2013.01); *Y02T 10/642* (2013.01)

(58) Field of Classification Search
USPC ...... 701/22; 180/65.1, 65.21, 65.265, 65.25; 307/9.1, 10.1, 10.7; 477/7
See application file for complete search history.

(56) References Cited

U.S. PATENT DOCUMENTS

| | | | |
|---|---|---|---|
| 5,722,502 | A | 3/1998 | Kubo |
| 6,116,363 | A * | 9/2000 | Frank |
| 6,295,500 | B1 | 9/2001 | Cullen et al. |
| 6,345,222 | B1 | 2/2002 | Toukura et al. |
| 6,359,404 | B1 | 3/2002 | Sugiyama et al. |
| 6,484,833 | B1 * | 11/2002 | Chhaya et al. .......... 180/65.225 |
| 6,664,651 | B1 * | 12/2003 | Kotre et al. .................... 290/29 |

(Continued)

*Primary Examiner* — Yonel Beaulieu
(74) *Attorney, Agent, or Firm* — David B. Kelley; Brooks Kushman P.C.

(57) ABSTRACT

A hybrid electric vehicle includes an internal combustion engine, a traction battery, and a hybrid electric powertrain including an electric motor powered by the traction battery and an electric generator coupled to the internal combustion engine and the traction battery. A control method includes determining minimum and maximum engine power limits based on desired wheel torque and traction battery charge and discharge power limits. A generator torque command is calculated to track engine speed to the desired engine speed. The generator torque command is limited based on the minimum and maximum engine power limits to limit engine power transmitted to the powertrain.

2 Claims, 4 Drawing Sheets

(56) References Cited

U.S. PATENT DOCUMENTS

| | | | |
|---|---|---|---|
| 6,994,360 B2* | 2/2006 | Kuang et al. | 180/65.235 |
| 7,073,615 B2 | 7/2006 | Mack | |
| 7,131,708 B2 | 11/2006 | Tao et al. | |
| 7,163,487 B2 | 1/2007 | Tao et al. | |
| 7,210,546 B2* | 5/2007 | Kuang et a | 180/65.265 |
| 7,398,845 B2* | 7/2008 | Kuang et al. | 180/65.265 |
| 7,971,667 B2* | 7/2011 | Yamazaki | 180/65.265 |
| 2006/0022469 A1 | 2/2006 | Syed et al. | |
| 2006/0101823 A1* | 5/2006 | Takemoto et al. | 60/716 |
| 2006/0199695 A1* | 9/2006 | Miller et al. | 477/2 |
| 2007/0125083 A1* | 6/2007 | Rollinger et al. | 60/605.1 |
| 2008/0257619 A1 | 10/2008 | Yamazaki | |
| 2008/0314663 A1* | 12/2008 | Yamazaki et al. | 180/165 |
| 2009/0150035 A1* | 6/2009 | Soliman et al. | 701/54 |
| 2009/0288895 A1* | 11/2009 | Klemen et al. | 180/65.25 |

* cited by examiner

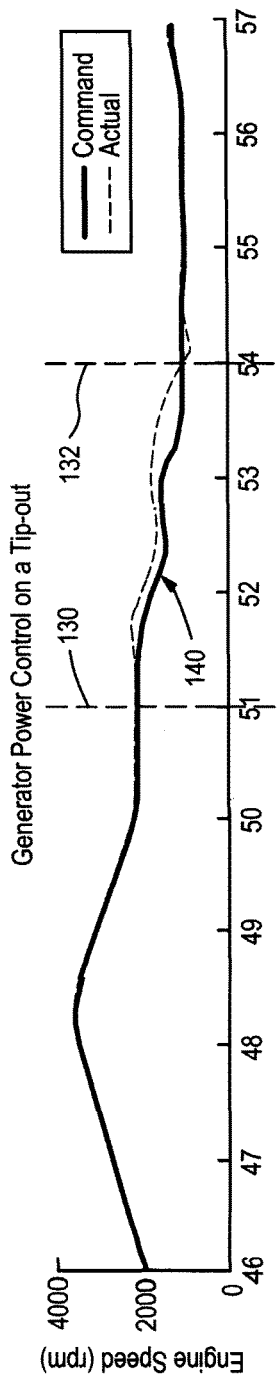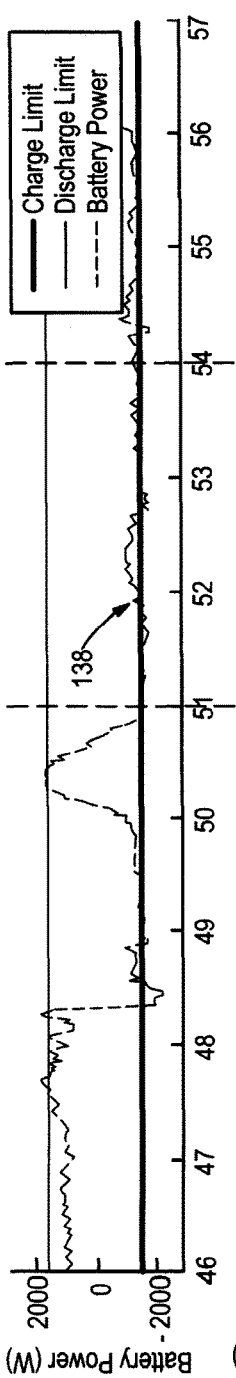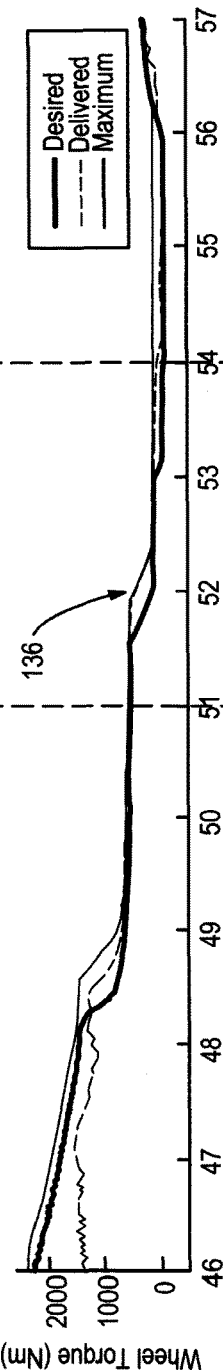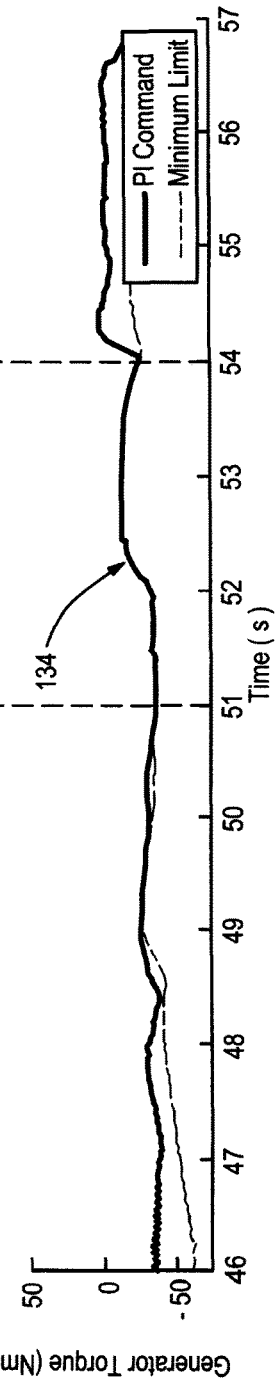

GENERATOR POWER CONTROL

BACKGROUND OF THE INVENTION

1. Field of the Invention

The invention relates to hybrid electric vehicles of the type including an internal combustion engine, a traction battery, and a hybrid electric powertrain. The invention further relates to limiting engine power transmitted to the powertrain under certain conditions.

2. Background Art

In an existing hybrid electric vehicle, a hybrid electric vehicle powertrain includes a vehicle system controller (VSC), an internal combustion engine, a traction battery, and a transmission including a motor-generator subsystem. These components form a powersplit powertrain, and the VSC may control the components in an attempt to maximize fuel economy.

Under some circumstances, it may be desirable to limit engine power transmitted to the powertrain.

Background information may be found in U.S. Pat. Nos. 5,722,502, 6,295,500, 6,345,222, 6,359,404, 7,073,615, 7,131,708, and 7,163,487. Further background information may be found in U.S. Pub. No. 2008/0257619.

SUMMARY OF THE INVENTION

In one embodiment of the invention, a method of controlling a hybrid electric vehicle is provided. The hybrid electric vehicle includes an internal combustion engine, a traction battery, and a hybrid electric powertrain including an electric motor powered by the traction battery and an electric generator coupled to the internal combustion engine and the traction battery. The method comprises establishing a desired engine speed, establishing a desired wheel torque, and determining minimum and maximum engine power limits. The engine power limits are based on the desired wheel torque, and traction battery charge and discharge power limits.

The method further comprises calculating a generator torque command to track engine speed to the desired engine speed. The generator torque command is limited based on the minimum and maximum engine power limits to limit engine power transmitted to the powertrain. The generator is controlled based on the generator torque command.

At the more detailed level, the invention comprehends further features that may be implemented in various embodiments of the invention, depending on the application. For example, in one implementation, the method further comprises establishing minimum and maximum wheel torque limits based on the desired wheel torque. The minimum and maximum engine power limits are further based on the minimum and maximum wheel torque limits.

In some implementations, the method further comprises calculating a motor torque command based at least in part on the desired wheel torque; and controlling the motor based on the motor torque command. Further, in such implementations, the method may include determining a portion of the desired wheel torque provided by the internal combustion engine; and calculating the motor torque command based on the desired wheel torque and the portion of the desired wheel torque provided by the internal combustion engine.

In some embodiments, the method further comprises providing a portion of the desired wheel torque with the internal combustion engine; and providing a portion of the desired wheel torque with the motor.

It is appreciated that embodiments of the invention may be implemented so as to limit the generator torque command based on minimum and maximum engine power limits to limit engine power transmitted to the powertrain. As well, it is appreciated that embodiments of the invention could be implemented to provided single sided limiting, such as limiting to a minimum engine power limit or limiting to a maximum engine power limit.

In this way, an embodiment of the invention provides a method comprising establishing a desired engine speed, establishing a desired wheel torque, and determining an engine power limit based on the desired wheel torque and a traction battery power limit. The method further comprises calculating a generator torque command to track engine speed to the desired engine speed, the generator torque command being limited based on the engine power limit to limit engine power transmitted to the powertrain. The generator is controlled based on the generator torque command.

Still further, embodiments of the invention may include a control unit for controlling a hybrid electric vehicle including an internal combustion engine, a traction battery, and a hybrid electric powertrain including an electric motor powered by the traction battery and an electric generator coupled to the internal combustion engine and the traction battery. The control unit is configured to establish a desired engine speed, establish a desired wheel torque, and determine an engine power limit based on the desired wheel torque and a traction battery power limit.

The control unit is further configured to calculate a generator torque command to track engine speed to the desired engine speed, the generator torque command being limited based on the engine power limit to limit engine power transmitted to the powertrain. The generator is controlled based on the generator torque command. The control unit may implement any number of the contemplated features.

BRIEF DESCRIPTION OF THE DRAWINGS

FIGS. 7A-7D illustrate generator power control on a tip-out.

DETAILED DESCRIPTION OF THE PREFERRED EMBODIMENT

Figure 1:
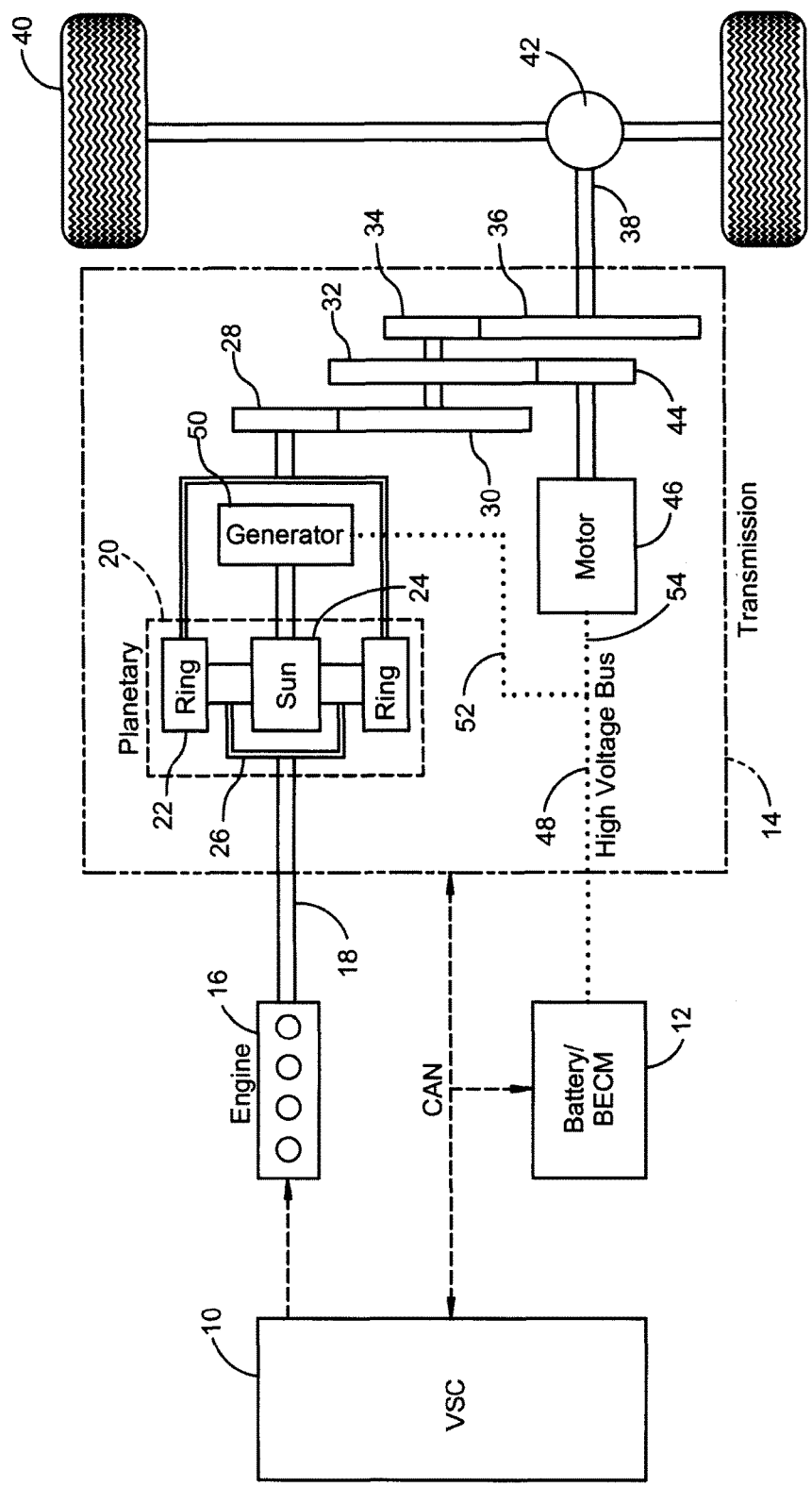
FIG. 1 is a schematic representation of a powersplit powertrain system configuration.

A hybrid electric vehicle powertrain is shown in FIG. 1. A vehicle system controller (VSC) 10, a battery and battery energy control module (BECM) 12, and a transmission 14, together with a motor-generator subsystem, comprise a control area network (CAN). An internal combustion engine 16, controlled by VSC 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34, and 36. A torque output shaft 38 for the transmission 14 is drivably connected to vehicle traction wheels 40 through a differential and axle mechanism 42.

Gears 30, 32, and 34 are mounted on a countershaft, with gear 32 engaging a motor-driven gear 44. Electric motor 46 drives gear 44, which acts as a torque input for the countershaft gearing.

The battery delivers electric power to the motor through power flow path 48, 54. Generator 50 is connected electrically to the battery and to the motor 46 in a known fashion as shown at 52.

The powersplit powertrain system of FIG. 1 may be operated in a variety of different modes as is appreciated by those skilled in the art. As shown, there are two power sources for the driveline. The first power source is a combination of the engine and generator subsystems, which are connected together using the planetary gear unit 20. The other power source involves the electric drive system including the motor 46, the generator 50, and the battery, where the battery acts as an energy storage medium for the generator 50 and the motor 46.

In general, VSC 10 calculates the total engine power needed to meet the drive wheel power demand plus all accessory loads, and independently schedules the engine speed and load operating point, with or without feedback of actual engine performance, to meet the total power demand. This type of approach is typically used to maximize fuel economy and may be used in other types of powertrain systems that have such VSCs.

Figure 2:
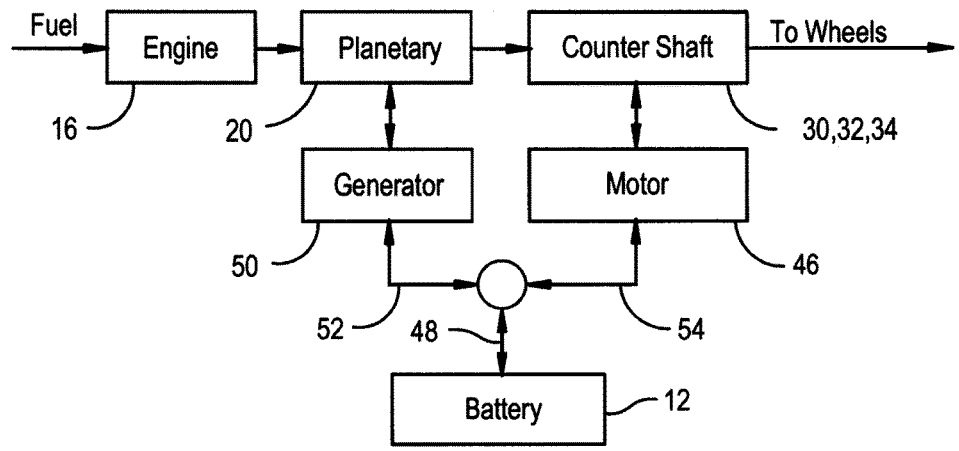
FIG. 2 is a schematic representation, in block diagram form, of a powertrain system power flow diagram.

The power flow paths between the various elements of the powersplit powertrain diagram shown in FIG. 1 are illustrated in FIG. 2. Fueling is scheduled based on driver and other inputs. Engine 16 delivers power to the planetary gear unit 20. The available engine brake power is reduced by accessory loads. Power is delivered by the planetary ring gear to the countershaft gears 30, 32, 34. Power output from the transmission drives the wheels.

Generator 50, when acting as a motor, can deliver power to the planetary gearing. When acting as a generator, generator 50 is driven by the planetary gearing. Similarly, power distribution between the motor 46 and the countershaft gears 30, 32, 34 can be distributed in either direction.

As shown in FIGS. 1 and 2, engine power output can be split into two paths by controlling generator 50. In operation, the system determines the driver's demand for torque and achieves the optimum split of power between the two power sources.

Figure 3:
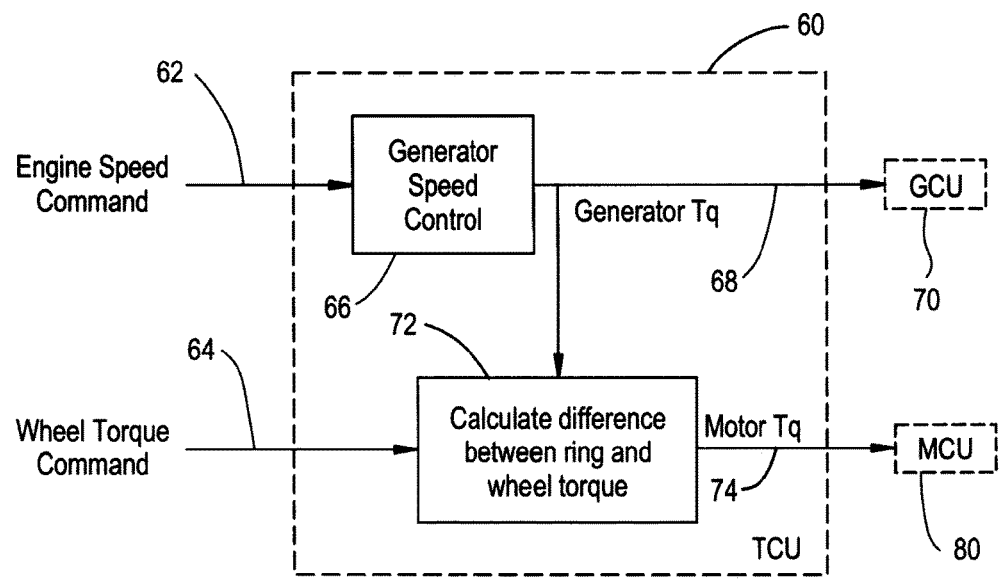
FIG. 3 is a schematic representation, in block diagram form, of a powertrain system control architecture.

In the powersplit hybrid, the generator torque is used to control the engine speed to a commanded speed, and the motor torque is used to control the wheel torque to a commanded torque. A high-level block diagram of this control architecture is shown in FIG. 3. The generator torque provides a reaction torque for the engine, thus, in addition to controlling engine speed, it also controls how much engine torque is transmitted through the powertrain.

In more detail, a desired wheel torque is generated based on accelerator and brake pedal inputs. Transmission control unit 60 receives an engine speed command 62 and a wheel torque command 64. Generator speed control block 66 receives the engine speed command 62 and provides an appropriate generator torque command 68 to the generator control unit 70. Control block 72 receives the wheel torque command 64 and provides an appropriate motor torque command 74 which is the calculated difference between the ring torque and wheel torque. Motor torque command 74 is provided to motor control unit 80.

Figure 4:
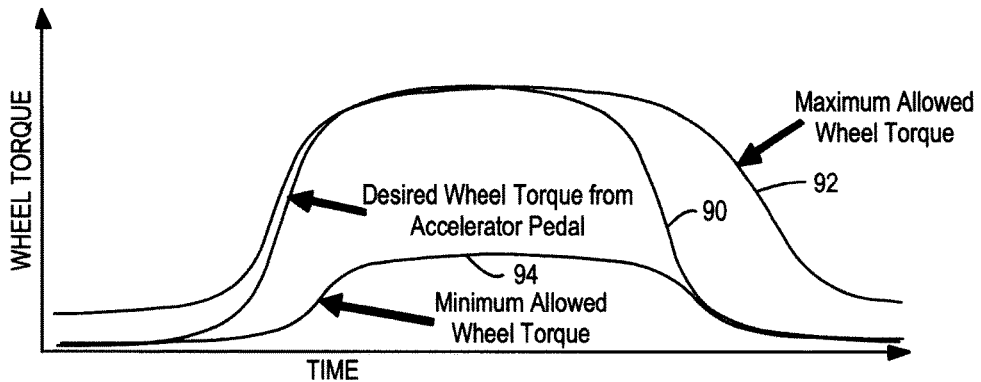
FIG. 4 is a graph depicting wheel torque versus time, illustrating wheel torque limitations for driver expectation.

The wheel torque delivered by the control system is permitted to deviate from the desired wheel torque when needed to control battery power within the battery charge and discharge limits; however, the size and direction of this modification is bounded by maximum and minimum wheel torque limits to ensure that the vehicle accelerates or decelerates as expected by the driver, as shown in FIG. 4.

FIG. 4 is a graph depicting wheel torque versus time, illustrating wheel torque limitations for driver expectation. In more detail, wheel torque curve 90 represents wheel torque over time in accordance with a desired wheel torque from the accelerator pedal. Wheel torque curve 92 represents wheel torque over time in accordance with a maximum allowed wheel torque. Wheel torque curve 94 represents wheel torque over time in accordance with a minimum allowed wheel torque. In this way, modification to delivered wheel torque is bounded to meet the driver expectation.

Figure 5:
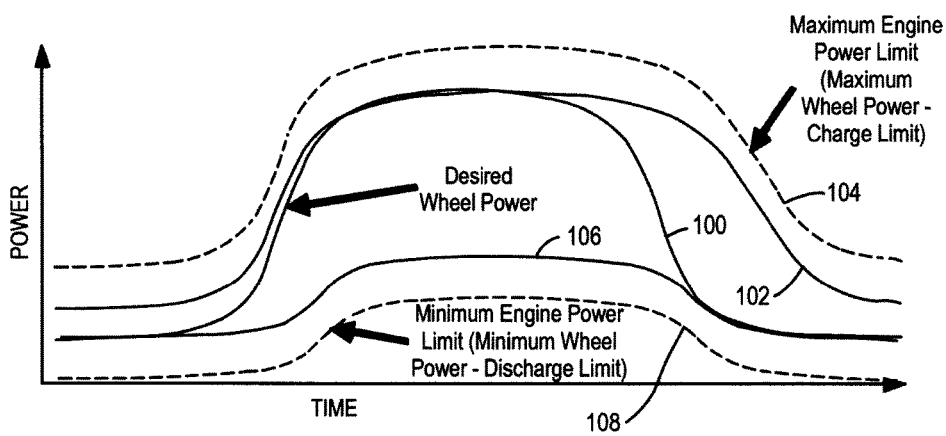
FIG. 5 is a graph depicting power versus time, illustrating overall system power limitations.

Based on these wheel torque limitations, and the battery power limits, overall system power limitations may be determined, as shown in FIG. 5.

FIG. 5 is a graph depicting power versus time, illustrating overall system power limitations. If the engine produces more power than the system maximum, the excess power will exceed the battery charge limit, and if the engine produces less power than the system minimum the power drawn from the battery will exceed the battery discharge limit. In more detail, power curve 100 represents desired wheel power over time in accordance with the desired wheel torque from the accelerator pedal. Power curve 102 represents maximum wheel power in accordance with the maximum allowed wheel torque. Power curve 104 represents maximum system power, that is, the combined maximum wheel power and battery charge limit. Power curve 106 represents minimum wheel power in accordance with the minimum allowed wheel torque. Power curve 108 represents minimum system power, that is, the combined minimum wheel power and battery discharge limit.

Embodiments of the invention limit engine power transmitted to the powertrain based on battery power limits and wheel torque limitations, and allow the remaining engine power to be sourced from, or sunk into, the engine resulting in a change in engine speed.

Figure 6:
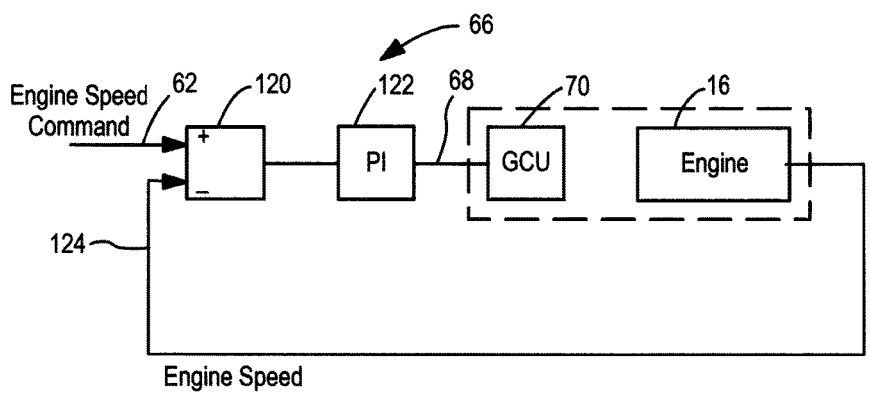
FIG. 6 illustrates engine speed control.

Under normal operation as shown in FIGS. 3 and 6, the engine speed is controlled to a reference speed, the commanded engine speed 62, through a feedback control system (illustrated as a PI, but alternative feedback algorithms are possible) resulting in the generator torque command 68. In more detail, FIG. 6 illustrates engine speed control. Engine speed command 62 is compared, at summing junction 120, to engine speed 124 to generate an error for proportional/integral (PI) control block 122. PI control block 122 produces the generator torque 68 provided to generator control unit 70.

This generator torque 68 also serves to deliver engine power to the powertrain. To limit the engine power delivered to the powertrain, a maximum and minimum generator torque are calculated based on the wheel torque limits and the battery's ability to source/sink power, and the range of authority of the engine speed PI control block 122 is limited to these generator torque limits. When the PI control block 122 is at the limit of its range of authority, the controller will no longer be able to maintain the commanded engine speed 62 as the excess engine power is absorbed by the engine speed.

The maximum and minimum generator torque limits for PI control block 122 are calculated from:

$$P_{wheel} = P_{mot} + P_{ring} \qquad (1)$$

$$P_{batt} = P_{mot} + P_{gen} + P_{loss} \qquad (2)$$

wherein $P_{wheel}$ is the wheel power, $P_{mot}$ is the motor power, $P_{ring}$ is the ring gear power, $P_{batt}$ is the battery power, $P_{gen}$ is the generator power, and $P_{loss}$ represents power losses. Using the bounds for wheel power and battery power, and considering the system maximum limit first:

$$P_{wheel\_max} - P_{ring} > P_{mot} > P_{charge\_limit} - P_{gen} - P_{loss}$$

wherein $P_{wheel\_max}$ is the maximum wheel power, $P_{ring}$ is the ring gear power, $P_{mot}$ is the motor power, $P_{charge\_limit}$ is the battery charge limit, $P_{gen}$ is the generator power, and $P_{loss}$ represents power losses.

Expressing ring power and generator power as a function of generator torque:

$$P_{wheel\_max} - P_{charge\_limit} + P_{loss} > (-T_{gen} * \text{gear\_ratios}) * W_{mot} - T_{gen} * W_{gen}, \text{ where } P_{ring} = (-T_{gen} * \text{gear\_ratios}) * W_{mot} \text{ and } P_{gen} = T_{gen} * W_{gen}$$

wherein $P_{wheel\_max}$ is the maximum wheel power, $P_{charge\_limit}$ is the battery charge limit, $P_{loss}$ represents power losses, $T_{gen}$ is the generator torque, gear_ratios represents gear ratios, $W_{mot}$ is the motor velocity, and $W_{gen}$ is the generator velocity.

The minimum generator torque limit is:

$$T_{gen} > -(P_{wheel\_max} - P_{charge\_limit} + P_{loss})/(W_{gen} + W_{mot} * \text{gear\_ratios})$$

wherein $T_{gen}$ is the generator torque, $P_{wheel\_max}$ is the maximum wheel power, $P_{charge\_limit}$ is the battery charge limit, $P_{loss}$ represents power losses, $W_{gen}$ is the generator velocity, $W_{mot}$ is the motor velocity, and gear_ratios represents gear ratios.

Similarly, the maximum generator torque limit is:

$$T_{gen} < -(P_{wheel\_min} - P_{discharge\_limit} + P_{loss})/(W_{gen} + W_{mot} * \text{gear\_ratios})$$

wherein $T_{gen}$ is the generator torque, $P_{wheel\_min}$ is the minimum wheel power, $P_{discharge\_limit}$ is the battery discharge limit, $P_{loss}$ represents power losses, $W_{gen}$ is the generator velocity, $W_{mot}$ is the motor velocity, and gear_ratios represents gear ratios.

FIGS. 7A-7D demonstrate how the minimum generator torque clip acts to limit engine power on a tip-out. In more detail, FIG. 7A depicts engine speed versus time. FIG. 7B depicts battery power versus time. FIG. 7C depicts wheel torque versus time. FIG. 7D depicts generator torque versus time.

Between the vertical dashed lines 130 and 132, the engine speed PI control is saturated at the minimum generator torque limit (134, FIG. 7D). During this time, the delivered wheel power is at the maximum wheel power limit (136, FIG. 7C), and the battery power is at the charge limit (138, FIG. 7B). This demonstrates that the minimum generator torque limit is limiting the engine power to the maximum power which the powertrain may consume. The remaining engine power increases engine speed above the commanded speed (140, FIG. 7A).

While the best mode for carrying out the invention has been described in detail, those familiar with the art to which this invention relates will recognize various alternative designs and embodiments for practicing the invention as defined by the following claims.

What is claimed:
1. A vehicle comprising:
   an engine;
   a battery;
   a generator coupled to the engine and battery; and
   a controller configured to control the generator such that in response to a command to reduce wheel torque, a speed of the engine decreases at a rate that depends on a state of charge of the battery.
2. A vehicle comprising:
   an engine;
   a battery;
   a generator coupled to the engine and battery; and
   a controller configured to control the generator such that in response to a command to reduce wheel torque, a speed of the engine increases for a period of time that depends on a state of charge of the battery.

* * * * *